United States Patent [19]

Sellstrom et al.

[11] Patent Number: 5,049,411

[45] Date of Patent: * Sep. 17, 1991

[54] POLYMER CONCRETE COMPOSITION FOR CEMENTITIOUS ROAD REPAIR AND OVERLAY ON WET AND DRY SURFACES

[75] Inventors: Kathy B. Sellstrom, Pflugerville; Harold G. Waddill, Austin, both of Tex.

[73] Assignee: Texaco Chemical Company, White Plains, N.Y.

[ * ] Notice: The portion of the term of this patent subsequent to Feb. 27, 2007 has been disclaimed.

[21] Appl. No.: 453,733

[22] Filed: Dec. 20, 1989

[51] Int. Cl.$^5$ ............................................. C08G 59/56
[52] U.S. Cl. .................................... 427/136; 427/140; 523/466; 528/111
[58] Field of Search ................ 427/136, 140; 523/466; 528/111

[56] References Cited

U.S. PATENT DOCUMENTS

| | | | |
|---|---|---|---|
| 3,236,895 | 2/1966 | Lee et al. | 260/584 |
| 3,462,393 | 8/1969 | Legler | 260/47 |
| 3,496,138 | 2/1970 | Sellers et al. | 260/47 |
| 3,875,072 | 4/1975 | Waddell | 252/102 |
| 4,189,564 | 2/1980 | Waddill | 528/94 |
| 4,487,805 | 12/1984 | Sellstrom et al. | 428/413 |
| 4,487,806 | 12/1984 | Sellstrom et al. | 427/40 |
| 4,828,879 | 5/1989 | Sellstrom et al. | 427/140 |
| 4,904,711 | 2/1990 | Sellstrom et al. | 523/466 |

OTHER PUBLICATIONS

Decorative Aggregate Studies I–IV (Texaco Chemical Company; TSB–1195, 1196, 1198 and 1199).

Gupta, Kar and Mani, "Effect of Binder Content and Coupling Agents on Mechanical Properties of Epoxy Aggregate Composites", *Journal of Reinforced Plastics and Composites*, vol. 1 (Oct., 1982).

Advance technical bulletin concerning Jeffamine® EDR–148, Texaco Chemical Company.

Technical bulletins for Jeffamine T–403; Jeffamine D–400; Jeffamine D–230; Texaco Chemical Co.

New product development technical bulletin concerning Jeffamine® EDR–148; Texaco Chemical Company.

*Primary Examiner*—Janyce Bell
*Attorney, Agent, or Firm*—Jack H. Park; Kenneth R. Priem

[57] ABSTRACT

A polymer concrete system has been discovered which is useful in road overlay and repair in both wet and dry conditions. The binder for this aggregate-filled system consists of a liquid epoxy resin and triethyleneglycol diamine or tetraethylene glycol diamine combined with polyoxypropylene glycol diamine curing agent. A piperazine accelerator ensures adequate strength development after short cure times at ambient temperatures.

The binder-aggregate system is relative flexible, has excellent compression and flexural strength and adheres well to the substrate. The system is distinguished by its binding strength to smooth or rough surfaces whether the surfaces are wet or dry.

9 Claims, No Drawings

POLYMER CONCRETE COMPOSITION FOR CEMENTITIOUS ROAD REPAIR AND OVERLAY ON WET AND DRY SURFACES

BACKGROUND OF THE INVENTION

1. Field of the Invention

This invention is a method for repairing or resurfacing cementitious concrete roads. The method comprises the application of an epoxy resin binder-aggregate composition.

2. Discussion of Prior Publications

Epoxy resins constitute a broad class of polymeric materials having a wide range of physical characteristics. The resins are characterized by epoxide groups which are cured by reaction with catalysts or curing agents to provide cured epoxy resin compositions with certain desirable properties.

U.S. Pat. No. 4,828,879 to K. B. Sellstrom and H. G. Waddill teaches a polymer concrete system useful in road overlay and repair using an epoxy resin mixed with triethyleneglycol diamine or tetraethylene glycol diamine.

U.S. Pat. No. 4,487,806 to K. B. Sellstrom and H. G. Waddill teaches a decorative epoxy resin aggregate binder composition. The composition comprises a vicinal polyepoxide, a stoichiometric amount of polyoxypropylene glycol diamine curative, nonylphenol and m-xylylene diamine. The composition is used to bind aggregate to cement surfaces such as patios and driveways of residential houses. The composition is a clear coating intended for outdoor use, which is noted for not yellowing with exposure to sunlight. U.S. Pat. No. 4,487,805 to K. B. Sellstrom teaches a decorative epoxy resin binder-aggregate composition. The composition comprises a vicinal polyepoxide, a stoichiometric amount of polyoxypropylene glycol diamine curative, nonylphenol, N-aminoethylpiperazine and a substituted benzotriazole ultraviolet light absorber. The composition is used to bind aggregate to large cement surfaces such as patios and driveways of residential houses. The composition is noted for not yellowing over time with exposure to sunlight.

U.S. Pat. No. 3,496,138 to R. F. Sellers and C. F. Pitt teaches curable epoxy resin compositions. These compositions include the reaction product of a diepoxide with a diamine such as the diamines of ethylene glycol, diethylene glycol, poly(ethylene glycol), propylene glycol, butylene glycol, etc. These compositions were used as adhesives and as coatings.

U.S. Pat. No. 3,236,895 to J. M. Lee and J. C. Winfrey and U.S. Pat. No. 3,462,393 to Legler are pioneer patents. They describe a series of amine compounds which are solids or liquids and have utility particularly in curing epoxy resins. The amine compounds have the general formula:

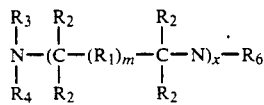

wherein R's are selectively defined as hydrogen, alkyl radicals and alkylene oxide radicals and x and m are defined integers.

U.S. Pat. No. 3,875,072 to H. G. Waddill teaches an accelerator for curing epoxy resins. The accelerator comprises piperazine and an alkanolamine in a weight ratio of 1:8 to 1:1. A number of alkanolamines are taught with triethanolamine preferred. U.S. Pat. No. 4,189,564 to H. G. Waddill teaches the accelerator comprising piperazine, N-aminoethylpiperazine and an alkanolamine. The accelerators are said to be synergistic for accelerating the curing of a polyglycidyl ether of a polyhydric phenol cured with a polyoxyalkylene polyamine at ambient or elevated temperatures. Such amines include polyoxypropylene diamines of the formula:

wherein x ranges from 2 to 40.

Decorative Aggregate Studies I-IV (Texaco Chemical Company; TSB-1195, -1196, -1198, and -1199) describe the formulation of weatherable epoxy systems for binding decorative aggregate to concrete.

Gupta, Kar, and Mani, "Effect of Binder Content and Coupling Agents on Mechanical Properties of Epoxy-Aggregate Composites", *Journal of Reinforced Plastics and Composites,* Vol.1(October, 1982), pp. 370–377, discusses the effect of binder:filler ratios and the use of silane coupling agents in an aggregate-filled epoxy system cured with a polyamide resin.

There is a need for an epoxy polymer concrete system which will adhere well to both smooth and rough cementitious substances whether the substrate is wet or dry when the epoxy polymer concrete system is applied.

SUMMARY OF THE INVENTION

The invention is a method for repairing a fault in a cementitious surface. The method comprises applying an aggregate and binder system to the fault. The binder comprises a vicinal polyepoxide having an average of at least 1.8 reactive 1,2-epoxy groups per molecule, a stoichiometric amount of a triethylene glycol diamine or tetraethyleneglycol diamine curative either or both combined with polyoxypropylene diamine curative and optionally an accelerator.

DETAILED DESCRIPTION OF THE INVENTION

Epoxy resin systems have been used to repair or resurface roadways because of their unique ability to bond well with Portland cement concrete. However, it has been discovered that systems using either polyethylene glycol diamines or polyoxyproylene diamines do not consistently bind well to wet cementitious surfaces. We have invented an epoxy resin-aggregate system which overcomes this deficiency.

The binder formulation of this invention has many of the advantages of the system disclosed in our U.S. Pat. No. 4,828,879 and that disclosure is incorporated herein by reference. However, as the data in this application will show, the combination of polyethylene glycol diamine curing agent and polyoxypropylene diamine curing agent provides superior adherence to both dry and wet cementitious substrates where the substrate may be either rough or relatively smooth. The data shows that in a shear test the bond between the cementitious substrate and the epoxy system disclosed and claimed herein is stronger than the cementitious surface. Therefore, when a shear force brought to bear on a cementitious/overlay made according to this invention that the cementitious surface breaks first. This provides a useful advantage since the overlay will not provide a weak point for further breakage, and the repaired cementitious surface will be stronger than the original.

The invention is useful in preparing aggregate-filled systems for road and bridge repair, such as bridge deck overlays.

Generally the vicinal polyepoxide containing compositions which may be cured with the products of the invention are organic materials having an average of at least 1.8 reactive 1,2-epoxy groups per molecule. These polyepoxide materials can be monomeric or polymeric, saturated or unsaturated, aliphatic, cycloaliphatic, aromatic or heterocyclic, and may be substituted if desired with other substituents besides the epoxy groups, e.g., hydroxyl groups, ether radicals, aromatic halogen atoms and the like. These vicinal polyepoxide containing compounds typically are of an epoxy equivalent weight of 150 to 250. Preferably the polyepoxide, which has an epoxide equivalent weight of from 175 to 195, is derived from condensing epichlorohydrin with 2,2-bis(p-hydroxyphenyl)propane to form 2,2-bis[(p-2,3 epoxy propoxy)phenyl]propane, a derivative of bisphenol A.

Preferred polyepoxides are those of glycidyl ethers prepared by epoxidizing the corresponding allyl ethers or reacting by known procedures, a molar excess of epichlorohydrin and an aromatic polyhydroxy compound, i.e. isopropylidene bisphenol, novolac, resorcinol, etc. The epoxy derivatives of methylene or isopropylidene bisphenols are especially preferred.

A widely used class of polyepoxides which are useful according to the instant invention includes the resinous epoxy polyethers obtained by reacting an epihalohydrin, such as epichlorohydrin, and the like, with either a polyhydric phenol or a polyhydric alcohol. Typically the epoxy resins have an average of at least 1.8 reactive, 1,2-epoxy groups per molecule. An illustrative, but by no means exhaustive, listing of suitable dihydric phenols includes 4,4-isopropylidene bisphenol, 2,4'-dihydroxydiphenylethylmethane, 3,3'-dihydroxydiphenyldiethylmethane, 3,4'-dihydroxydiphenylmethylpropylmethane, 2,3'-dihydroxydiphenylethylphenylmethane, 4,4'-dihydroxydiphenylpropylphenylmethane, 4,4'-dihydroxydiphenylbutylphenylmethane, 2,2'-dihydroxydiphenylditolylmethane, 4,4'-dihydroxydiphenyltolylmethylmethane and the like. Other polyhydric phenols which may also be co-reacted with an epihalohydrin to provide these epoxy polyethers are such compounds as resorcinol, hydroquinone, substituted hydroquinones, e.g., methylhydroquione, and the like.

Among polyhydric alcohols which can be coreacted with an epihalohydrin to provide these resinous epoxy polyethers are such compounds as ethylene glycol, propylene glycols, butylene glycols, pentane diols, bis(4-hydroxycyclohexy)dimethylmethane, 1,4-dimethylobenzene, glycerol, 1,2,6-hexanetriol, trimethylolpropane, mannitol, sorbitol, erythritol, pentaerythritol, their dimers, trimers and higher polymers, e.g. polyethylene glycols, polypropylene glycols, triglycerol, dipentaerythritol and the like, polyallyl alcohol, polyhydric thioethers, such as 2,2'-3,3'-tetrahydroxydipropylsulfide and the like, mercapto alcohols such as monothioglycerol, dithioglycerol and the like, polyhydric alcohol partial esters, such as monostearin, pentaerythritol monoacetate and the like, and halogenated polyhydric alcohols such as the monochlorohydrins of glycerol, sorbitol, pentaerythritol and the like.

Another class of polymeric polyepoxides which can be cured to form the polymer concrete of the present invention includes the epoxy novolac resins obtained by reacting, preferably in the presence of a basic catalyst, e.g. sodium or potassium hydroxide, an epihalohydrin, such as epichlorohydrin, with the resinous condensate of an aldehyde, e.g. formaldehyde, and either a monohydric phenol, e.g., phenol itself, or a polyhydric phenol. Further details concerning the nature and preparation of these epoxy novolac resins can be obtained in Lee, H. and Neville, K., Handbook of Epoxy Resins, McGraw Hill Book Co., New York, 1967.

A combination of two general types of amine curing agents for epoxies is required for this invention. The first type comprises triethylene glycol diamines and tetraethylene glycol diamines. These materials are sold as JEFFAMINE ® EDR-148 triethyleneglycoldiamine and JEFFAMINE ® EDR-192 tetraethyleneglycoldiamine by Texaco Chemical Company.

The second type of amine curing agent comprises polyoxypropylenediamines and may be represented by the general formula:

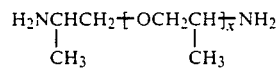

wherein x ranges from about 2 to about 33. Specifically the following commercial products are available from Texaco Chemical Company.

x=2.6
JEFFAMINE ® D-230 polyoxypropylenediamine
x=5.6
JEFFAMINE ® D-400 polyoxypropylenediamine
x=33.1
JEFFAMINE ® D-2000 polyoxypropylenediamine Individual multiple products from both types of amine curing agents may be combined for purposes of this invention.

Any accelerator known to those skilled in the art may be useful in this invention if it does not detract from the properties or the system. A particularly preferred accelerator is designated Accelerator 399. Accelerator 399 is a mixture of piperazine and 5–10% N-aminoethylpiperazine in triethanolamine. It is described in U.S. Pat. No. 4,189,564 to H. G. Waddill.

Because of the relative cost, it is desirable to minimize the amount of binder in any composition. To achieve this end, while maintaining a product of acceptable quality, the aggregate combination must be chosen to yield the smallest void volume. The aggregate formulation used in the Example is based on the results of the publication *Optimization of Polymer Concrete for Flame Spread Specimens*, by Troy Madeley, Technical Memorandum No. 2., University of Texas, Austin, Tex., July 1984. This publication reports that a combination of 60 wt % of ⅜ inch gravel, 30 wt % sand and 10 wt % fine material produced a low void volume. As a result, the aggregate used in the present work was 60 wt % of ⅜ inch gravel, 30 wt. % sand and 10 wt. % fly ash.

The aggregate-binder ratio was adjusted to yield the most workable system. Ratios of 7:1 to 12:1 were tried. It was found that for an aggregate based on ⅜ inch gravel, that the optimal weight ratio of aggregate-binder was 11:1. For an aggregate comprising pea gravel, a ratio of 8.5:1 was determined to be most workable. Compositions comprising more aggregate, i.e. greater than 12:1, were judged to be unworkable. Compositions comprising less aggregate than 7:1 ratio were judged not to be cost effective.

This invention is shown by way of Example.

EXAMPLE 1

| Properties of Unfilled Binder System. Formulation, pbw | |
|---|---|
| Liquid epoxy resin (EEW 188) | 100 |
| JEFFAMINE ® D-230 | 10.3 |
| JEFFAMINE EDR-148 | 15.3 |
| Accelerator 399 | 5 |
| Properties of Cured ⅛-inch Casting cured 7 days 25° C. | |
| Shore D hardness, 0-10 sec | 80-72 |
| Izod impact strength, ft-lb/in | 0.16 |
| HDT, °C., 264 psi load | 45 |
| Tensile strength, psi | 9600 |
| Tensile modulus, psi | 469000 |
| Elongation at break, % | 4.5 |
| Flexural strength, psi | 14800 |
| Flexural modulus, psi | 502000 |
| % wt. gain, 24-hr water boil | 4.0 |

EXAMPLE 2

| Mechanical Properties of Polymer Concrete (PC) Formulations | | | |
|---|---|---|---|
| Binder Formulation, pbw | PC-1 | PC-2 | PC-3 |
| Liquid epoxy resin (EEW 188) | 100 | 100 | 100 |
| JEFFAMINE D-230 | 32 | — | 10.3 |
| JEFFAMINE EDR-148 | — | 20 | 15.3 |
| Accelerator 399 | 20 | 15 | 10 |
| Aggregate Mix | | | |
| ⅜-inch gravel 60% | | | |
| coarse sand 30% | | | |
| fly ash 10% | | | |
| Filler:binder ratio | 11:1 | 11:1 | 11:1 |
| Compression strength, psi | | | |
| after 3 hrs at 70° F. | — | 10000 | 12600 |
| after 6 hrs at 70° F. | 1800 | 12300 | 13200 |
| after 12 hrs at 70° F. | 8500 | 13100 | 13800 |
| after 24 hrs at 70° F. | 12200 | 13300 | 14200 |
| Compression modulus, psi at 70° F. | 3,980,000 | 4,170,000 | 4,510,000 |
| Flexural strength, psi at 70° F. | 2950 | 3000 | 2800 |
| Flexural modulus, psi at 70° F. | 3,000,000 | 2,480,000 | 1,490,000 |
| Coefficient of Thermal Expansion, in/in/°F. × $10^{-6}$ | | | |
| at 80° F. | 8.3 | 7.9 | 7.3 |
| at 120° F. | 13.1 | 16.2 | 16.6 |

EXAMPLE 3

Shear Bond Strength Between Polymer Concrete and Portland Cement Concrete

Thin overlays of polymer concrete were applied to blocks of cured Portland cement concrete. The Portland cement concrete blocks had either smooth surfaces or rough surfaces and were either dry or saturated with water. Shear force was applied until either the bond between the polymer concrete failed or the Portland concrete substrate failed.

| Overlay Material | Surface Texture | Moisture Level | Shear Bond Strength, psi | Approximate % of failure in Portland cement concrete |
|---|---|---|---|---|
| PC-1 | smooth | dry | 790 | 100 |
|  |  | wet | 610 | 25 |
|  | rough | dry | 790 | 100 |
|  |  | wet | 790 | 100 |
| PC-2 | smooth | dry | 770 | 100 |
|  |  | wet | 480 | 0 |
|  | rough | dry | 680 | 100 |
|  |  | wet | 590 | 5 |
| PC-3 | smooth | dry | 740 | 100 |
|  |  | wet | 510 | 100 |
|  | rough | dry | 810 | 100 |
|  |  | wet | 620 | 100 |

The above results show that with PC-3 the bond between the Portland cement concrete and the epoxy concrete overlay was stronger than the Portland cement concrete under all conditions.

We claim:

1. A method for repairing a fault in a cementitious road, comprising applying to the fault a composition comprising:
   A. A binder comprising:
      (1) a vicinal polyepoxide having an average of at least 1.8 reactive 1,2-epoxy groups per molecule;
      (2) a stoichiometric amount of a curing agent comprising triethyleneglycol diamine and polyoxypropylene diamine;
      (3) An accelerator and
   B. aggregate.

2. The method of claim 1 wherein the aggregate comprises gravel, sand and fly ash.

3. The method of claim 1 wherein the aggregate:binder weight ratio is 7:1 to 12:1.

4. The method of claim 1 wherein the polyoxypropylene diamine has a molecular weight of about 200.

5. The method of claim 1 wherein the polyoxypropylene diamine has a molecular weight of about 400.

6. A method for coating a cementitious road comprising applying to the surface of the road a composition comprising:
   A. A binder comprising:
      (1) a vicinal polyepoxide having an average of at least 1.8 reactive 1,2-epoxy groups per molecule;
      (2) a stoichiometric amount of a curing agent comprising triethyleneglycol diamine and polyoxypropylene diamine;
      (3) an accelerator comprising an effective amount of a combination of piperazine and N-aminoethylpiperazine, and
   B. aggregate comprising gravel, sand and fly ash wherein the aggregate:binder weight ratio is 7:1 to 12:1.

7. A composition comprising:
   (1) a vicinal polyepoxide having an average of at least 1.8 reactive 1,2-epoxy groups per molecule;
   (2) a stoichiometric amount of a curing agent comprising triethyleneglycol diamine and polyoxypropylene diamine;
   (3) An accelerator and
   B. aggregate.

8. A composition as in claim 7 wherein the polyoxypropylenediamine has a molecular weight of about 200.

9. A composition as in claim 7 wherein the polyoxypropylenediamine has a molecular weight of about 400.

* * * * *